United States Patent
Linck

(10) Patent No.: US 10,184,510 B2
(45) Date of Patent: Jan. 22, 2019

(54) METHOD OF MAKING A CARBON COMPOSITE PISTON ENGINE CRANKSHAFT

(71) Applicant: James Walter Linck, San Diego, CA (US)

(72) Inventor: James Walter Linck, San Diego, CA (US)

( * ) Notice: Subject to any disclaimer, the term of this patent is extended or adjusted under 35 U.S.C. 154(b) by 0 days.

(21) Appl. No.: 15/711,800

(22) Filed: Sep. 21, 2017

(65) Prior Publication Data

US 2018/0073551 A1    Mar. 15, 2018

Related U.S. Application Data

(63) Continuation-in-part of application No. 15/149,164, filed on May 8, 2016.

(60) Provisional application No. 62/159,266, filed on May 9, 2015.

(51) Int. Cl.
| | | |
|---|---|---|
| *F16C 3/10* | (2006.01) | |
| *B29C 70/34* | (2006.01) | |
| *B29L 31/00* | (2006.01) | |
| *B29K 307/04* | (2006.01) | |
| *B29K 63/00* | (2006.01) | |

(52) U.S. Cl.
CPC ............. *F16C 3/10* (2013.01); *B29C 70/342* (2013.01); *B29K 2063/00* (2013.01); *B29K 2307/04* (2013.01); *B29L 2031/75* (2013.01); *F16C 2206/06* (2013.01)

(58) Field of Classification Search
CPC .... F16C 3/026; F16C 3/06; F16C 3/08; F16C 3/10; B21D 53/84
See application file for complete search history.

(56) References Cited

U.S. PATENT DOCUMENTS

| | | | | |
|---|---|---|---|---|
| 4,465,434 A | * | 8/1984 | Rourk | F01D 5/282 416/230 |
| 4,683,809 A | | 8/1987 | Taylor | |
| 4,867,644 A | * | 9/1989 | Wright | C22C 47/064 416/230 |
| 5,041,253 A | * | 8/1991 | Husted | B29C 37/0082 164/112 |
| 5,320,795 A | * | 6/1994 | Mitchell | B29C 33/44 264/318 |
| 6,026,568 A | * | 2/2000 | Atmur | F02B 41/00 264/640 |
| 6,036,904 A | * | 3/2000 | Fantino | B29C 70/202 264/102 |
| 6,135,070 A | * | 10/2000 | Crandall | F02B 75/22 123/193.6 |

(Continued)

FOREIGN PATENT DOCUMENTS

| | | |
|---|---|---|
| DE | 3011358 A1 | 10/1980 |
| WO | 2004056553 A1 | 7/2004 |

*Primary Examiner* — Ruth Ilan

(74) *Attorney, Agent, or Firm* — Timothy W. Fitzwilliam

(57) ABSTRACT

A piston engine crankshaft made from carbon composite material molded in two separate moldings is disclosed. According to a preferred embodiment, the first mold is optimized to for the top dead center piston ignition load. The second molding takes the dynamic piston and rod load and contains the counterweight. Accordingly, carbon fiber filaments are aligned in preferred directions to ideally absorb loads at different areas of the crankshaft.

6 Claims, 3 Drawing Sheets

(56) References Cited

U.S. PATENT DOCUMENTS

| | | | |
|---|---|---|---|
| 6,216,585 B1 | 4/2001 | Chellappa | |
| 6,500,515 B1* | 12/2002 | Fantino | B29C 70/202 |
| | | | 428/105 |
| 6,912,929 B2 | 7/2005 | Leith | |
| 8,024,993 B2* | 9/2011 | Dal Pra | B29C 70/081 |
| | | | 74/594.1 |
| 2003/0024347 A1* | 2/2003 | Leith | F16C 3/10 |
| | | | 74/595 |
| 2007/0151698 A1* | 7/2007 | Yu | B22C 9/064 |
| | | | 164/137 |
| 2008/0238029 A1* | 10/2008 | Inoue | B60B 27/023 |
| | | | 280/281.1 |
| 2012/0260885 A1 | 10/2012 | Linck | |
| 2015/0292550 A1* | 10/2015 | Streckel | F16C 7/026 |
| | | | 74/579 E |
| 2018/0030924 A1* | 2/2018 | Coppola | F02F 7/0085 |
| 2018/0038469 A1* | 2/2018 | Brahm | B29C 65/1635 |
| 2018/0073551 A1* | 3/2018 | Linck | F16C 3/10 |

\* cited by examiner

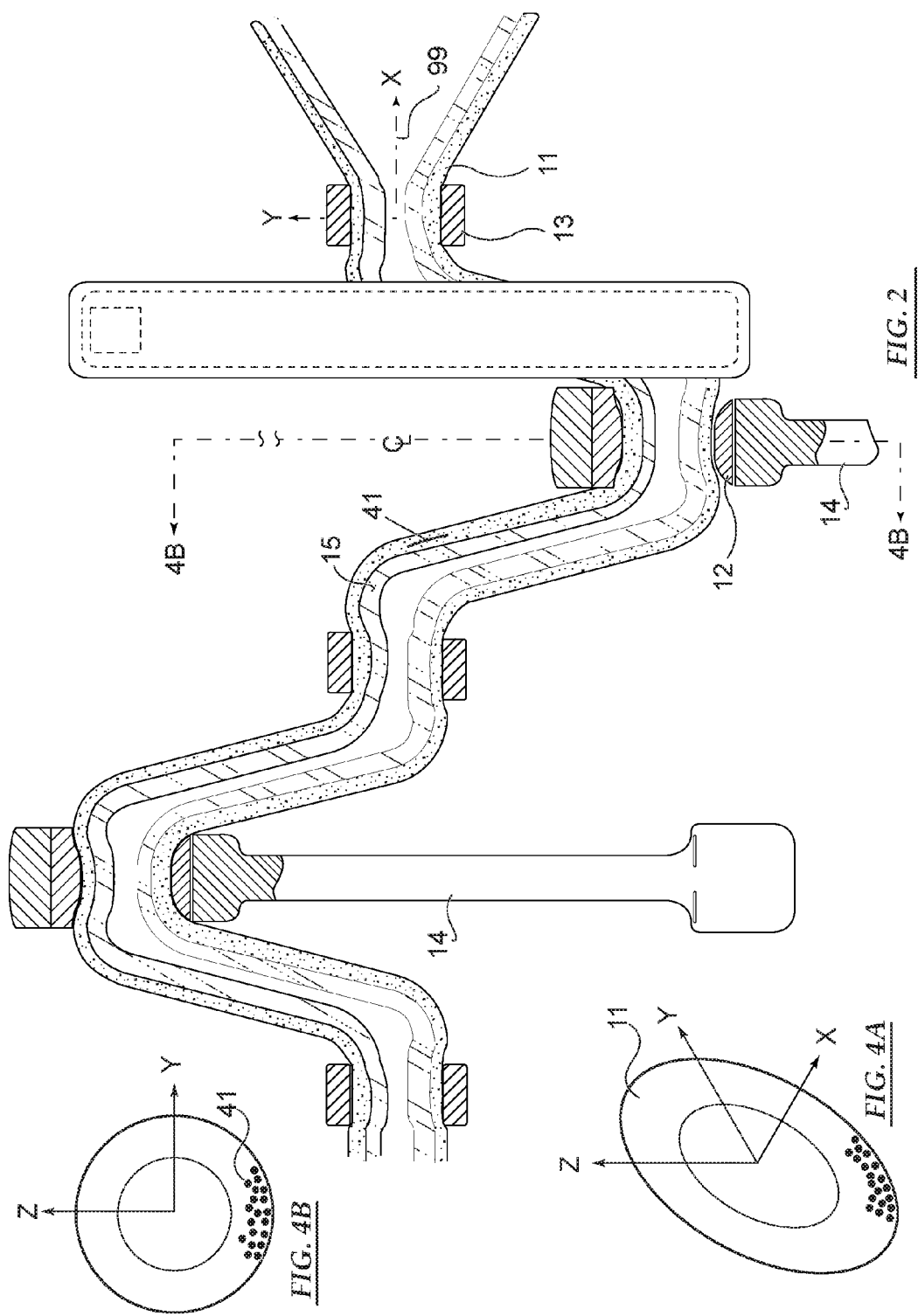

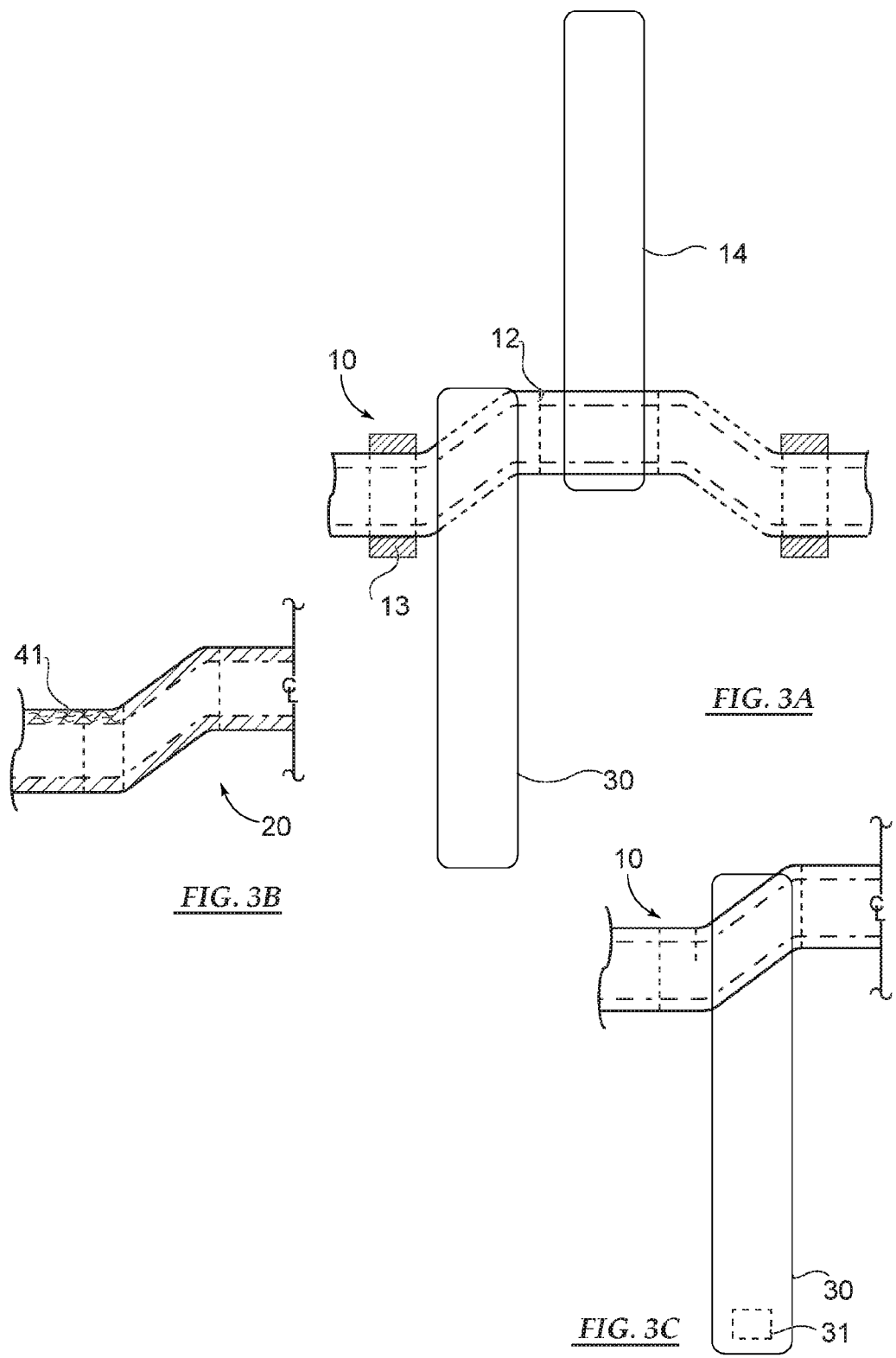

METHOD OF MAKING A CARBON COMPOSITE PISTON ENGINE CRANKSHAFT

PRIORITY CLAIM

This patent application is a continuation-in-part and claims benefit of the priority date of U.S. patent application Ser. No. 15/149,164 entitled "Carbon Composite Piston Engine Crankshaft," filed on May 8, 2016, which in turn, claims benefit of the priority date of U.S. Prov. Pat. App. Ser. No. 62/159,266 filed on May 9, 2015, accordingly, the entire contents of these patent submissions are hereby expressly incorporated by reference.

BACKGROUND OF THE INVENTION

Field of the Invention

The present invention pertains generally to crankshafts that mechanically convert reciprocating motion to rotational motion, for example in a train, automobile, or aircraft. More specifically, in a preferred embodiment, the invention relates a carbon composite crankshaft for a piston engine made from two separate molds.

Description of the Prior Art

Heretofore, crankshafts have been known coupled to a piston cylinder arrangement via a connecting rod. Further configured to the crankshaft are journal bearings that flank the rotating connection between the rod and crankshaft. Importantly, particularly at high revolutions per minute (RPM) on the order of $3 \times 1{,}000$ to $5 \times 1{,}000$, the crankshaft will undergo complex loading to include bending and flexing as well as centrifugal stresses.

Also notable, metal crankshafts are relatively heavy and are typically made from a single body cast repeatedly forged into shape for maximum structural integrity. Since metal material such as steel has crystalline lattice structure, loads are not optimized for any particular direction. Composites, on the other hand, are vastly different wherein material layers form a lay-up. Hence, a filament can absorb structural loads only in a direction of the filament. And, lay-ups should have filaments aligned in every direction corresponding to loads which makes the fabrication process very complex.

An illustrative example of composite loading is the airplane wing. Therein, loads are received similar to an I-beam structure in that filaments on top are all in compression (toward a direction of bending stress) and the filaments on the bottom are all in tension. The filaments in the middle are all in shear. The crankshaft presents a complex problem because it's not static loaded like the airplane wing, rather instead; loads result from spinning and counter balanced rotational motion that are very dynamic. Therefore it is an object of the present invention to address multiple dynamic loading to different areas of the crankshaft. The present solution takes the top dead center bending stresses in one molding, and the spinning structural loads of the connecting rod in addition to the counter balance load in a second molding.

Further in the present global energy objective, fuel economy is paramount and market prices for petroleum based fuels are complex. Therefore, the present invention seeks to provide technologies that reduce engine load under its own weight, potentially having a profound commercial impact.

An additional parameter in crankshaft design is temperature performance. This is because components made from carbon composite begin to lose strength at a much lower 180 degrees Fahrenheit as compared to steel crankshafts which maintain performance at much higher temperatures.

In light of the above, it is an object of the present invention to provide a lightweight crankshaft wherein different parts are integrally optimized to receive differently types of loads. It is further an object of the present invention to provide an objective for laying up carbon fiber filaments in construction of a lightweight crankshaft. Still further it is an object of the present invention to provide cooling solution for a composite crankshaft.

BRIEF SUMMARY OF THE INVENTION

The present invention specifically addresses and alleviates the above mentioned deficiencies, more specifically, the present invention in a first aspect is a carbon composite crankshaft for piston engines made from a process comprising two separate moldings wherein a first mold aligns carbon fiber filaments in a direction substantially parallel to an axis or rotation of the crankshaft and wherein a second mold aligns carbon fiber filaments in substantially all directions.

In a second closely related aspect, the invention is a carbon composite crankshaft, made from a process comprising the steps of molding a main shaft portion with a $1^{st}$ mold: laying up a multiplicity of carbon composite filaments substantially along an axis parallel to the main shaft in the first mold; and molding a counterweight portion with a $2^{nd}$ mold wherein carbon composite filaments are arranged substantially in a direction of stresses to the counterweight.

The invention in this aspect is additionally characterized in that the step of molding a counterweight portion with a $2^{nd}$ mold is more specifically characterized wherein carbon composite filaments are arranged substantially in a direction of stresses to the counterweight. More specifically, filaments are arranged in a direction substantially perpendicular to the crankshaft. In another arrangement, a multiplicity of carbon composite filaments are substantially along an axis parallel to the main shaft in the first mold. Alternatively, $2^{nd}$ mold is used to align carbon fiber filaments substantially in all directions; or in all directions in a perpendicular plane.

Also in this aspect the invention is characterized as including the bonding the counterweight portion to the main shaft portion using a series of carbon filaments and a resin such as an epoxy.

In yet another aspect the invention may be characterized as a method of making a carbon composite crankshaft for piston engines, the method comprising: providing a first mold, the first mold for manufacturing a main crankshaft portion; aligning carbon fiber filaments in a direction substantially parallel to an axis of rotation of the crankshaft (an axis such as an x-axis); providing a second mold, the second mold for manufacturing a counterweight portion and wherein a second mold aligns carbon fiber filaments in substantially all directions perpendicular to the axis of rotation of the crankshaft (that is all directions in a y-z plane).

In still another aspect the invention is characterized as a method for making a carbon composite crankshaft, the method comprising: providing a $1^{st}$ mold, for manufacturing a main shaft portion; laying up a multiplicity of carbon composite filaments substantially parallel to an axis of rotation of the main shaft portion in the 1st mold; and molding a counterweight portion with a $2^{nd}$ mold wherein carbon composite filaments are arranged substantially in a plane perpendicular to the axis of rotation of the main shaft, to exclude directions outside the plane perpendicular to the axis, (meaning just in the y-z plane) providing material strength in light of operational (this being a dynamic multiple directions of) stresses to the counterweight.

The invention in this aspect is additionally characterized as further comprising bonding the counterweight portion to the main shaft portion using additional filaments and a resin such as an epoxy; and yet still further wherein the bonding the counterweight portion to the main shaft portion using additional filaments and a resin such as an epoxy. This step also employs an elongated carbon fiber filament over the main shaft portion. Optionally the filament arrangement is in substantially all directions in an y-z plane in manufacturing the counterweight.

Still further methods herein comprise inserting an inflatable bladder to the $1^{st}$ mold for manufacturing a hollow crankshaft; and inserting a heavy inert material to the $2^{nd}$ mold providing counter balance to the crankshaft.

While the apparatus and method has or will be described for the sake of grammatical fluidity with functional explanations, it is to be expressly understood that the claims, unless expressly formulated under 35 USC § 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC § 112 are to be accorded full statutory equivalents under 35 USC § 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2 is an overhead sectional illustration of a main crankshaft portion of the present invention having a counterweight affixed thereto;

FIG. 3A is a schematic side view of one half of a preferred crankshaft for a one cylinder or multi-cylinder engine;

FIG. 3B is an additional side view of a first mold cavity for the piston loading portion of the crankshaft;

FIG. 3C is illustrative of a second mold cavity that comprises the piston and rod counterweight as adhered to the crankshaft;

FIG. 4A is a schematic view of a hollow wall of a main crankshaft; and

FIG. 4B is a schematic axial view of the hollow wall of the main crankshaft approximately along line 4B-4B in FIG. 2.

DESCRIPTION OF PREFERRED EMBODIMENTS

Figure 1:
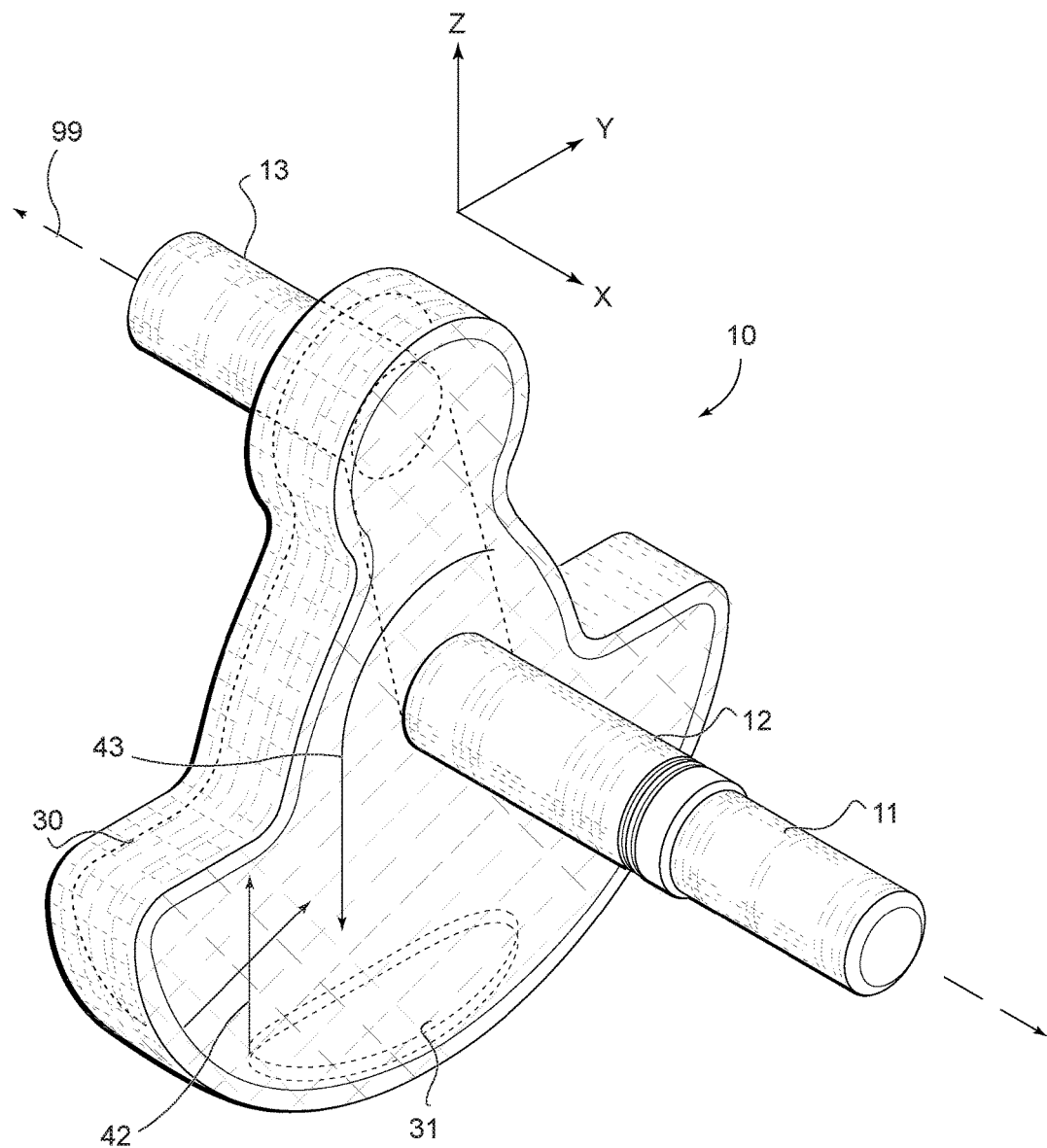
FIG. 1 is a rendering of a crankshaft counter weight coupled to a main shaft portion.

With regard to FIG. 1 a portion of a crankshaft 11 for coupling to a piston cylinder arrangement is shown with particular attention to a counter weight 30 element. As stated, the invention in a first aspect is a carbon fiber piston engine crankshaft; but further made from two molds. According to various embodiments 10 herein, a first mold 20 (FIG. 3B) constructs the crankshaft using a series of carbon fiber 41 composite lay ups continuously formed on top of one another. A second mold in turn constructs the counterweight 30. Importantly in the second mold, fibers 42, 43 are aligned perpendicular to the crankshaft axis of rotation 99, also corresponding to an x-axis herein. Particularly, relatively shorter fibers 42 in the second counterweight mold are perpendicular to the x-axis in a y-z plane. Alternatively, fibers 42 in the counterweight 30 mold 20 are in all directions in the y-z plane. Also according to the invention, the fibers 42, 43 in the second mold are exclusive to the y-z plane. Still further, an elongated fiber 43 wraps around what is to be the crankshaft 11 in the counterweight mold. An elongated fiber 43 may be defined as having a length twenty or more times as long as compared to its diameter.

With regard to FIG. 2 together with FIG. 1, rod bearing 12 and crankshaft bearing 13 are illustrated, the former configured to a connecting rod 14. An inflatable bladder 15 may further be inserted to the first crankshaft mold 20 to provide a hollow configuration to the molding process; the hollow side walls 11 are also illustrated in FIG. 4A and FIG. 4B.

With regard to FIG. 3A, the invention in a first aspect is a carbon composite piston engine crankshaft 10 made in two separate moldings (FIG. 3B and FIG. 3C). The first molding 20 takes the piston ignition loading. In other words, the stresses the expanding cylinder imparts on the crankshaft 11 at top dead center. The second molding takes the piston and rod dynamic loading and contains their counterweight 30. The mold material carrying complex loading is a high modulus composite material which can be made in many ways. The bearing and lubrication requirements of the carbon composite crankshaft 11 are similar to steel crankshafts.

Further with regard to FIG. 3A through FIG. 3C, the invention 10 is a method for making a carbon fiber piston engine crankshaft 10, 11 initially using a first mold 20 followed by molding a counterweight 30 from a second mold. Subsequently, the invention includes the step of bonding the counterweight 30 to the crankshaft 11. The invention 10 in this aspect is additionally characterized as aligning (or laying-up) a plurality of carbon matrix filaments 41 in a longitudinal direction with respect to the crankshaft 11, or the crankshaft 11 having an axis of rotation 99 (or x-axis, FIG. 2). A second mold has a unique lay-up 42 optimized for centrifugal loads as these loads are more problematic than the piston loads at 5,000 rpm. The counterweight 30 made from the second mold is more specifically bonded to the main shaft 11 with a matrix having a plurality of elongated filaments 43 that wrap around the first lay-up main shaft.

Also with regard to FIG. 3A, a portion of an exemplary crankshaft having a counterweight 11 is shown. FIG. 3B illustrates the first mold 20, about a center line (CL), designed to absorb piston loads without brittle fracture. Rod bearing 12 and crankshaft bearing 13 are further integrated to the carbon composite crankshaft and are comprised of softer material, such as lead, that can support the spinning crankshaft with proper wear properties.

Also, importantly in the process to reduce weight, an inflatable bladder 15 is inserted into a mold cavity and thereby forming a crankshaft 11 having hollow portions further reducing weight thereof without sacrificing strength. Interior side walls are illustrated in FIG. 3A, FIG. 3B and FIG. 3C with lines outlining a hollow interior.

FIG. 3C illustrates a second molding for making a piston and rod counterweight 30. The second mold allows for material fibers having high modulus to be loaded in a different geometry, or lay-up, or filament density, optimized for its different loading as compared to the shaft piston loading. A heavy inert material 31 is additionally inserted to the counterweight 30 mold in the molding process. Still further, inert material 31 may be recycled after useful engine life. Fully manufactured, the carbon composite piston engine, In still an additional embodiment, the invention is a carbon composite crankshaft 10 that is oil cooled with forced convention using two different oil pumps. As stated, the carbon composite will peak in structural performance at 180 degrees and rapidly decline at even higher temperatures. Ideally, the crankshaft 10 is maintained at just over 150 degrees which is problematic since the oil coming off the combustion chamber area is much hotter.

Also of concern, piston engines with one oil pump are often over used. This is because the engine is able to spin past peak load so the pump is set at the higher load. But however, a vehicle piston engine will typically operate primarily under peak. Hence according to the invention, two oil lubrication and cooling pumps are provided wherein a first is run at or under peak and the second pump supplements after peak, which facilitates engine longevity and wear. Also according to this embodiment, the first pump is configured to begin lubrication just before start-up which provides pre-oil to the engine particularly increasing its lifetime. Therefore further, the invention comprises an engine oil system having two pumps configured with a separator that keeps the top oil and crankcase separated until they enter the oil cooler. Additionally, as an example for keeping the crankcase cool, a first oil pump will start prior to engine ignition. A second pump has a start up trip point of high RPM; and hence increases the life of both pumps and not providing more cooling than necessary.

It should be understood, of course, that the foregoing relates to exemplary embodiments of the invention and that modifications may be made without departing from the spirit and scope of the invention as set forth in the following claims.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

While the particular Carbon Composite Piston Crankshaft herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

I claim:

1. A method for making a carbon composite crankshaft, the method comprising:
    providing a $1^{st}$ mold, for manufacturing a main shaft portion;
    laying up a multiplicity of carbon composite filaments substantially parallel to an axis of rotation of the main shaft portion in the $1^{st}$ mold;
    molding a counterweight portion with a $2^{nd}$ mold wherein carbon composite filaments are arranged substantially in a plane perpendicular to the axis of rotation of the main shaft, to exclude directions outside the plane perpendicular to the axis, providing material strength in light of operational stresses to the counterweight; and
    bonding the counterweight portion to the main shaft portion using additional filaments and a resin.

2. The method for making a carbon composite crankshaft of claim 1, wherein the bonding of the counterweight portion to the main shaft portion using additional filaments and a resin comprises employing an elongated carbon fiber filament over the main shaft portion.

3. The method for making a carbon composite crankshaft of claim 1, wherein the molding a counterweight portion with a $2^{nd}$ mold comprises laying up an additional multiplicity of carbon fiber filaments in substantially all directions in an y-z plane.

4. The method for making a carbon composite crankshaft of claim 1 further comprising inserting an inflatable bladder to the $1^{st}$ mold for manufacturing a hollow crankshaft.

5. The method for making a carbon composite crankshaft of claim 1 further comprising inserting a heavy inert material to the $2^{nd}$ mold providing counter balance to the crankshaft.

6. The method for making a carbon composite crankshaft of claim 1, wherein the resin is an epoxy.

* * * * *